G. A. MITCHELL.

METALLIC TIP AND METALLIC TIPPED BOOT AND SHOE.

No. 632. Reissued Dec. 7, 1858.

Witnesses
Meandrell J. Ludden
H. M. Brazee

Inventor
George A. Mitchell

THE NORRIS PETERS CO., PHOTO-LITHO., WASHINGTON, D. C.

UNITED STATES PATENT OFFICE.

GEORGE A. MITCHELL, OF TURNER, MAINE.

METAL TIPS FOR TOES OF BOOTS AND SHOES.

Specification forming part of Letters Patent No. 19,640, dated January 5, 1858; Reissue No. 632, dated December 7, 1858.

*To all whom it may concern:*

Be it known that I, GEORGE A. MITCHELL, of Turner, in the county of Androscoggin and State of Maine, have invented a new and useful metallic tip for protecting the upper and toe parts of boots and shoes from wear, and a new article of manufacture, consisting of a boot or shoe with these tips applied thereto; and I hereby declare that the following specification, in connection with the accompanying drawings and references thereon, constitutes a lucid, clear, and exact description of the construction, application, and use of the same.

Figure 4:
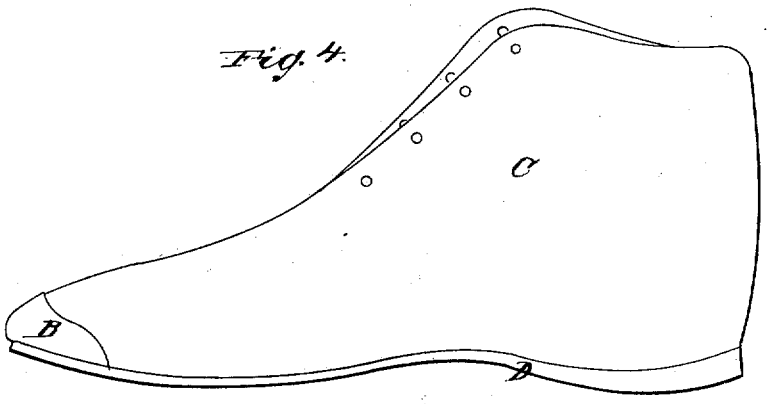
Figure 5:
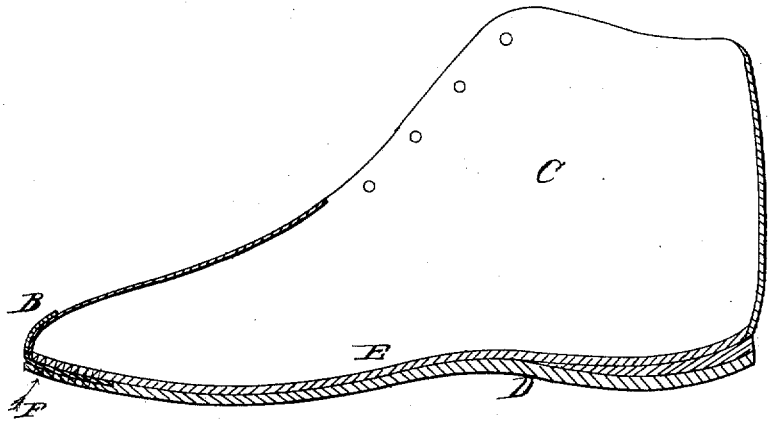
Figure 1:
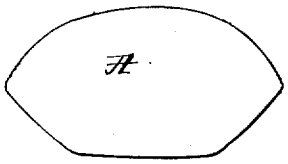
Figure 3:
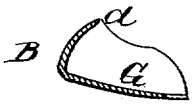
Figure 2:
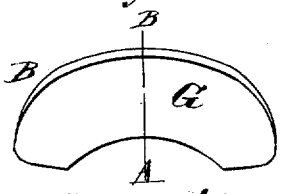

In referring to the said drawings, Figure 1 denotes a piece of sheet metal cut and ready to be shaped by dies to conform to the toe of the boot or shoe; Fig. 2, a plan of the same after being shaped; Fig. 3, a section on line A B of Fig. 2; Fig. 4, an elevation of a shoe with metallic tip applied thereto; Fig. 5, a longitudinal and vertical section of Fig. 4.

The nature of my invention consists in the construction of metallic tips for preventing abrasion, wear, and destruction of the upper and toe portion of boots and shoes, and in applying these tips to boots and shoes, which constitutes them a new article of manufacture, all as will be hereinafter seen.

In order to enable persons skilled in the art to which my invention appertains to construct and carry out the same, I will describe it as follows:

I construct a die of chilled cast-iron or other material (not shown) with cavity formed therein of the shape of the toe of the boot or shoe, or of the tip to be applied thereto, and a follower of hardened steel or other durable material (not shown) exactly of the shape of the cavity formed in the die, less the thickness of the metal for the tip. I make use of sheet metal or any desired material of a ductile nature, which may be jappanned or colored black or otherwise prepared, but prefer brass or copper, by reason of its ductility and cheapness, and in not being liable to rust, and in thickness about No. 20 of the ordinary wire-gage, or more or less, as may be required, and cut it into plates, (seen at A,) or of any desired proportion, and place them, one at a time, upon the die, over the cavity, and then bring the follower or punch down upon it, by which it is instantly formed of the required shape or "struck up," as seen at B, Figs. 2, 3, 4, and 5, by the force and movement of punch or follower which compresses the plate A into the die, and of the desired form to conjoin with the shape of the toe of the shoe, as seen at Figs. 4 and 5. The "striking up" or forming of the tip adds greatly to its temper, hardness, and strength, and where they are desired to be highly ornamental, silver or silver-plated copper or brass, or German silver may be used. After the tip has received its general form, the inner and upper portion (seen at Fig. 3) is rounded off by steel burr cutter or otherwise, as seen at *a*, to prevent the edge which would be otherwise left from cutting the upper-leather, as will be readily understood.

The manner of fabrication or manufacture of my metallic-tipped boot or shoe, or of applying my tip to boots or shoes, which constitutes them a new article of manufacture when the tips are so applied, is as follows: The boot or shoe is "lasted"—a term used by shoe-makers to indicate a boot or shoe when the inner sole, E, Fig. 5, is nailed upon a last—and the upper-leather C also placed thereon and sewed or pegged to the inner sole, E, Fig. 5. Then the outer sole, D, is placed on over the inner sole and that portion of the upper-leather C which remains between the soles E and D, and then pegged, nailed, or sewed, as may be desired, to that portion of the shoe previously lasted, excepting the toe, sufficient of which is left for the convenient introduction of the portion G of the tip B between the outer and inner soles, E and D, as seen at Figs. 4 and 5, while the outer and upper portion of the tip nicely conjoins in shape or form to the outer and upper or toe part of the shoe or boot, and the tip is secured firmly to the shoe by nails or pegs F, Fig. 5, driven through the outer sole, D, the tip B, and then into and through the inner sole, E, to which they are clinched, care being taken that these nails or pegs fit snugly into each of the soles and the tip, in order to firmly unite the outer to the inner sole, as well as to strongly secure the tip to the shoe or boot.

It will be seen that about the usual quantity of nails or pegs driven into the toe part of ordinary boots or shoes is used in my invention. The ordinary awl answers every purpose, and is as readily and easily driven through the tip as the leather on either side of it ;and my tip, when applied as just described, not only protects that part of the boot or shoe which it covers from wear, but it adds strength, and consequent durability, to the entire boot or shoe.

It is well known that the upper-leather at the toes of the ordinary boot and shoe is the first to be worn out, and this natural and unavoidable result arises from the greater contact which this portion of the upper part of the shoe or boot is liable to have when in use; and from this unavoidable and well-known predominance of wear at this point the boot or shoe is worn through, or so as to require mending when they are otherwise less than half worn out. This is the case particularly with children's and youths' boots and shoes and to those worn in the rude occupations, and have to be consequently thrown aside when nearly all parts of them are good. And the object of my invention is to cheaply and effectually avoid the aforesaid serious defects by never allowing them to occur, as well as to impart an increased durability to the entire boot or shoe by giving the greatest strength to that part heretofore the weakest and soonest destroyed, and to cause them to longer retain their elegance of form and new appearance, all as will be readily seen.

Having thus described my invention, I will state my claim, as follows:

What I claim as my invention, and desire to secure by Letters Patent, as a new article of manufacture, is—

1. My within-described metallic tip, constructed in the manner and for the purposes fully set forth.

2. As a new article of manufacture, a metallic tipped boot or shoe, constructed essentially in the manner and for the purposes fully set forth and described.

GEORGE A. MITCHELL.

Witnesses:
MANDEVILLE T. LUDDEN,
H. M. BEARD.